US009290129B1

(12) United States Patent
Wurzer et al.

(10) Patent No.: US 9,290,129 B1
(45) Date of Patent: Mar. 22, 2016

(54) ANTI-SLIP STEP PLATE FOR A MOTOR VEHICLE

(71) Applicants: Adam J. Wurzer, Carroll, IA (US); Terry D. Wurzer, Panora, IA (US); David T. Wurzer, Carroll, IA (US)

(72) Inventors: Adam J. Wurzer, Carroll, IA (US); Terry D. Wurzer, Panora, IA (US); David T. Wurzer, Carroll, IA (US)

( * ) Notice: Subject to any disclaimer, the term of this patent is extended or adjusted under 35 U.S.C. 154(b) by 0 days.

(21) Appl. No.: 14/836,221

(22) Filed: Aug. 26, 2015

(51) Int. Cl.
*B60R 3/00* (2006.01)
*B60R 3/04* (2006.01)

(52) U.S. Cl.
CPC ...... *B60R 3/00* (2013.01); *B60R 3/04* (2013.01)

(58) Field of Classification Search
CPC .......... B60R 3/00; B60R 3/002; B60R 3/007; B60R 3/02; B60R 3/04
USPC ............ 280/163, 169, 164.1, 164.2; 182/127
See application file for complete search history.

(56) References Cited

U.S. PATENT DOCUMENTS

| 5,738,180 A * | 4/1998 | Hofmann ............ B62J 25/00 180/291 |
| 5,961,138 A * | 10/1999 | Roark ............... B62J 25/00 280/291 |
| 8,596,662 B2 * | 12/2013 | Huang-Tsai ......... G05G 1/483 280/163 |

* cited by examiner

*Primary Examiner* — John Walters
(74) *Attorney, Agent, or Firm* — Dennis L. Thomte; Thomte Patent Law Office LLC (57) ABSTRACT

An anti-slip step plate for a motor vehicle such as a truck. The step plate includes a generally rectangular base member which is secured to a step of the vehicle. The step plate also includes an accent plate member which is positioned on the base member and secured thereto with the accent plate member having a plurality of slots formed therein which receive portions of the base member. The accent plate member is colored so as to have a different color than the base member. The accent plate member will be colored to match or accent colors or features of the vehicle.

19 Claims, 8 Drawing Sheets

ANTI-SLIP STEP PLATE FOR A MOTOR VEHICLE

BACKGROUND OF THE INVENTION

1. Field of the Invention

This invention relates to an anti-slip step plate for a motor vehicle such as a truck. More particularly, this invention relates to an anti-slip step plate for a motor vehicle such as a truck which includes a generally rectangular base member which is secured to a step of the vehicle and an accent plate member which is secured to and positioned on the base member. Even more particularly, the accent plate member is colored to match or accent certain features of the vehicle.

2. Description of the Related Art

Motor vehicles such as trucks have side steps for the driver and a passenger to step upon to gain access to the cab of the truck or to depart from the cab of the truck. Some of the prior art side steps have anti-slip metal tread surfaces at the upper sides thereof. However, the anti-slip metal tread surfaces cause undue wear on the footwear of the driver and passengers. Further, the metal tread surfaces of the prior art anti-slip side steps are usually gray or stainless steel in color which detracts from the appearance of the truck. Further, in some cases, side steps are positioned rearwardly of the cab of the truck for the driver to gain access to other parts of the truck.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An anti-slip step plate is provided for placement on a horizontally disposed motor vehicle step with the motor vehicle being a truck or the like. The step plate includes a horizontally disposed and generally rectangular-shaped base member having a first end, a second end, an outer end, an inner end, an upper surface and a lower surface. The upper surface of the base member has a generally transversely extending first end groove formed therein adjacent the first end of the base member and which has inner and outer ends. The base member also includes a generally transversely extending second end groove formed therein adjacent the second end thereof and which has inner and outer ends. The base member further includes a longitudinally extending outer end groove formed therein inwardly of the outer end of the base member and which has first and second ends. A longitudinally extending inner end groove is formed in the upper surface of the base member outwardly of the inner end thereof and which has first and second ends. The outer end of the first end groove communicates with the first end of the outer end groove and the inner end of the first end groove which communicates with the first end of the inner end groove. The outer end of the second end groove communicates with the second end of the outer end groove and the inner end of the second end groove communicates with the second end of the inner end groove. A plurality of spaced-apart and longitudinally extending intermediate grooves, having first and second ends, are formed in the upper surface of the base member with the first ends of the intermediate grooves being in communication with the first end groove and with the second ends of the intermediate grooves being in communication with the second end groove.

The grooves define an upstanding and elongated outer end bar, an upstanding and elongated inner end bar, and a plurality of upstanding and elongated intermediate bars positioned between the outer and inner end bars. Each of the bars preferably have an elongated groove formed therein which extends downwardly into the bar from the upper end thereof.

The step plate also includes a generally rectangular accent plate member having a first end member, a second end member, an outer end member, an inner end member, an upper surface and a lower surface. The accent plate member has a plurality of elongated and spaced-apart slots formed therein which are positioned between the outer end member and the inner end member thereof. The accent plate member is positioned on the base member so that the first end member is received in the first end groove, the second end member is received in the second end groove, the outer end member is received in the outer end groove, the inner end member is received in the inner end groove, and slots receive the bars. The accent plate member is secured to the base member.

The color of the accent plate member is different than the color of the base member so that the step plate is accented by the accent plate member. The color of the accent plate member is chosen to correspond to components or portions of the truck.

It is therefore a principal object of the invention to provide an improved anti-slip step plate for positioning on a horizontally disposed motor vehicle step.

A further object of the invention is to provide an anti-slip step plate which includes a base member having a first color and an accent plate member positioned thereon which has a color different than the color of the base member.

A further object of the invention is to provide an anti-slip step plate which is esthetically pleasing.

A further object of the invention is to provide an anti-slip step plate which includes a base member and an accent plate member with the accent plate member having a color which matches or accents the color of components or portions of the truck.

A further object of the invention is to provide an anti-slip step plate which is easily secured to a horizontally disposed motor vehicle step.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 designates the anti-slip step plate of this invention which is designed to be secured to a step 12 of a motor vehicle such as a truck 14. Step plate 10 is comprised of a base member 16 which is preferably constructed of metal such as aluminum. Base member 16 is generally rectangular in shape with the ends thereof being preferably slightly curved as seen in the drawings. Step plate 10 also includes a generally rectangular accent plate member 18 comprised of metal or plastic as will be described in detail hereinafter.

Base member 16 includes a flat lower surface 20 and an upper surface 22. Base member includes a slightly curved first end 24, a slightly curved second end 26, an outer end 28 and an inner end 30. A first slightly curved first end groove 32 is formed in upper surface 22 of base member 16 adjacent end 24 and has an outer end 34 and an inner end 36. A slightly curved second end groove 38 is formed in upper surface 22 of base member 16 adjacent end 26 of base member 16 and has an outer end 40 and an inner end 42.

An elongated outer end groove 44 is formed in upper surface 22 of base member 16 adjacent outer end 28 thereof and has a first end 46 and a second end 48. The ends 46 and 48 of groove 44 communicate with grooves 32 and 38 respectively. An elongated inner end groove 50 is formed in upper surface 22 of base member 16 and has a first end 52 and a second end 54. The ends 52 and 54 of groove 50 communicate with grooves 32 and 38 respectively. Elongated intermediate grooves 56, 58, 60 and 62 are formed in the upper surface 22 of base member 16 in a spaced-apart manner. As seen, one end of the grooves 56, 58, 60 and 62 communicate with first end groove 32 with the other ends of grooves 56, 58, 60 and 62 communicating with the second end groove 38. Each of the grooves in base member 16 have a flat lower end and vertical sides.

Grooves 44 and 56 define an elongated anti-skid bar 64 therebetween while grooves 56 and 58 define an elongated anti-skid bar 66 therebetween. Grooves 58 and 60 define an elongated anti-skid bar 68 therebetween and grooves 60 and 62 define an elongated anti-skid bar 70 therebetween. Grooves 62 and 50 define an anti-skid bar 72 therebetween. Bars 64, 66, 68, 70 and 72 have small grooves 74, 76, 78, 80 and 82 formed therein which extend downwardly into the bars from the upper ends thereof. The number of bars and the associated grooves will depend upon the size of the step plate 10. A plurality of bolt openings 84 are formed in base member 16.

Accent plate member 18 includes a first end member 86, a second end member 88, an outer end member 90 and an inner end member 92. Accent member 18 also includes intermediate members 94, 96, 98 and 100 which extend between end members 86 and 88 as seen in the drawings. The members 90, 94, 96, 98, 100 and 92 define elongated slots 102, 104, 106, 108 and 110. Accent member 18 has a plurality of bolt openings 112 formed therein which register with bolt openings 84. Accent plate member 18 may be comprised of metal or plastic.

Figure 8:
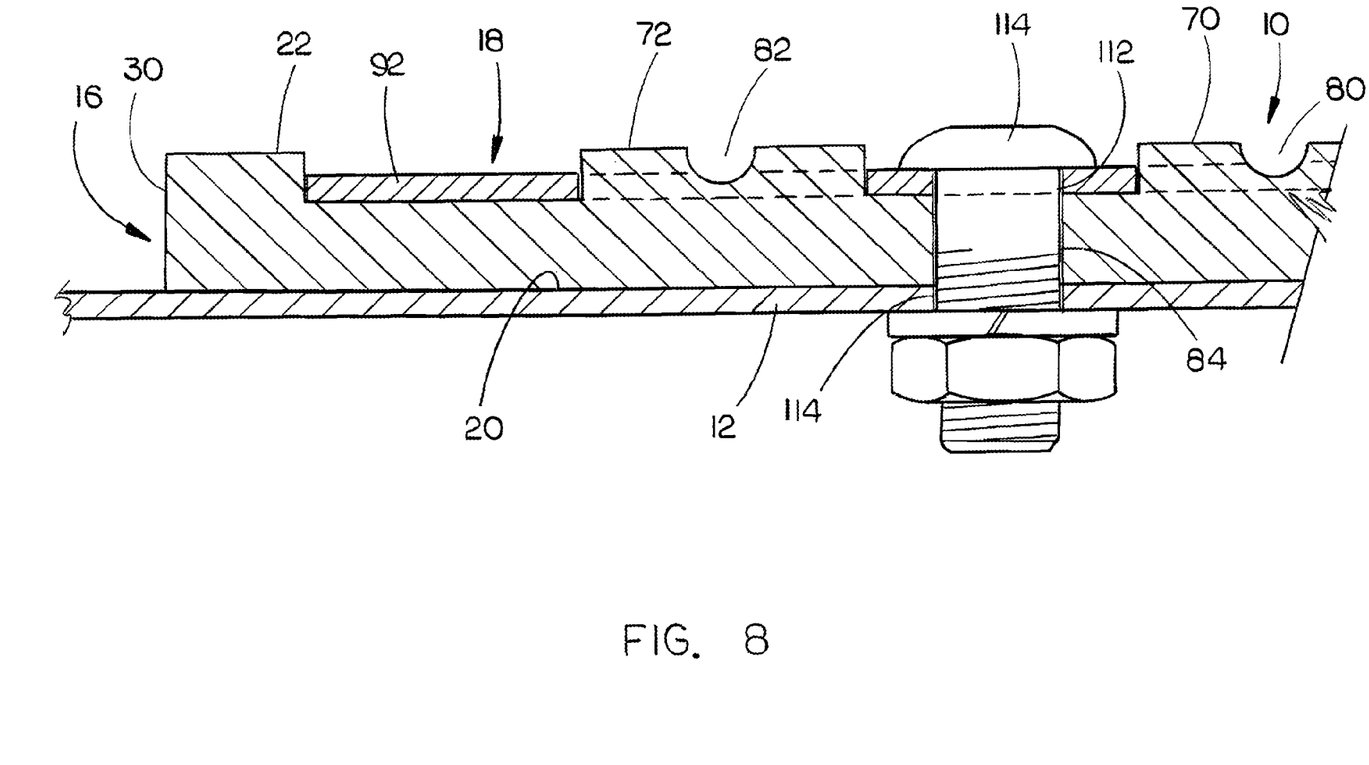
FIG. 8 is a partial sectional view of the anti-slip step plate mounted on a side step.

Accent plate member 18 is placed on base member 16 so that end member 86 is received in groove 32, end member 88 is received in groove 38, end member 90 is received in groove 44, end member 92 is received in groove 50, and intermediate members 94, 96, 98 and 100 are received in intermediate grooves 56, 58, 60 and 62 respectively. When accent plate member 18 is positioned on base member, bars 64, 66, 68, 70 and 72 are received by slots 102, 104, 106, 108 and 110 respectively. The thickness of the members 90, 94, 96, 98, 100 and 92 is less than the depth of the grooves in which they are positioned so that the upper ends of the bars 64, 66, 68, 70 and 72 are positioned above the accent plate member 18 to create anti-skid surfaces therein as seen in FIG. 8.

Bolts 114 extend downwardly through openings 112 in accent plate member 18, through openings 84 in base member 16 and through openings 114 in step 12 to secure the step plate to the step 12. Although the drawings illustrate that the accent plate member 18 is secured to the base member 16 by the bolts 114 and that the bolts 114 secure the base member 16 to the step, the base member 16 could be glued to the step 12 and the accent plate member 18 could be glued to the base member 16. Further, the base member 16 could be secured to the step 12 by double-faced adhesive tape and the accent plate member could be secured to base member 16 by double-faced adhesive tape.

Figure 9:
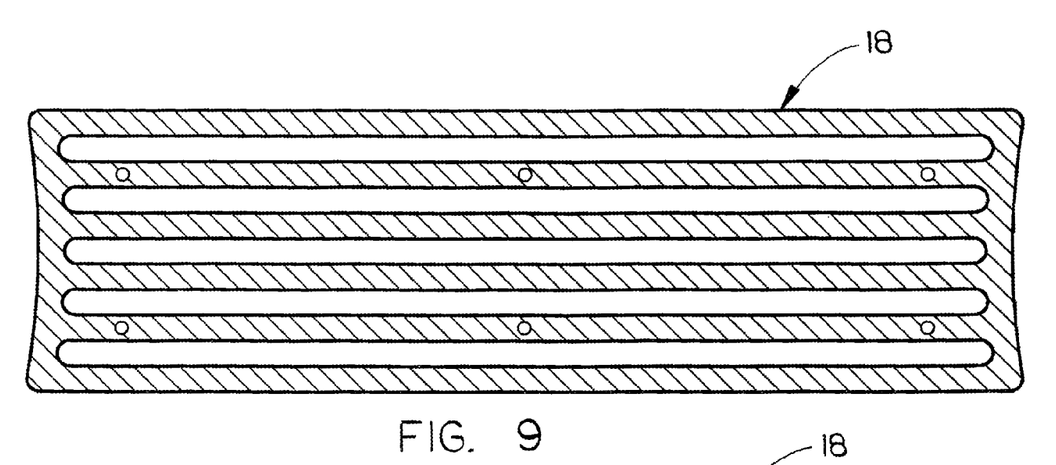
FIG. 9 is a plan view of an accent plate member having a different color.
Figure 10:
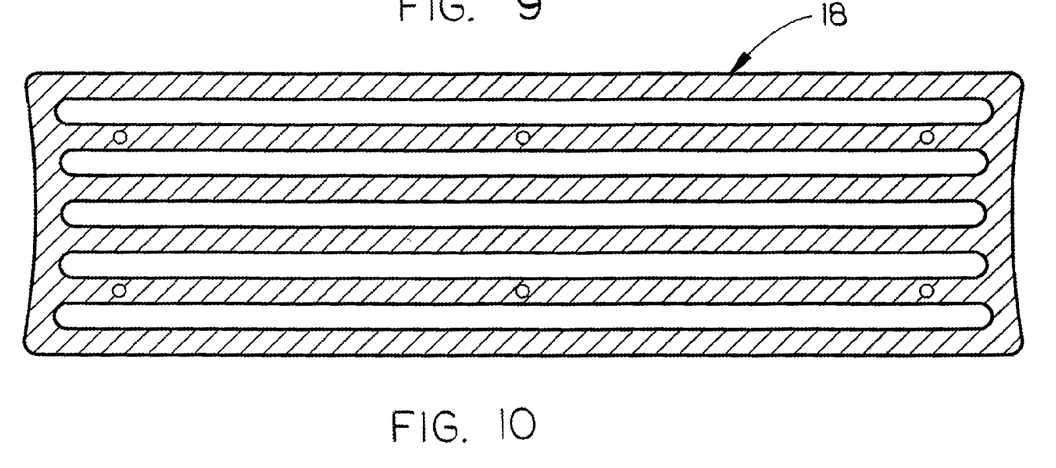
FIG. 10 is a plan view of another accent plate member having a different color than that of FIG. 9.

The accent plate member 18 may be blue, black, red, yellow, green or any color different than the color of base member 16 so as to correspond to the color of the truck or features or components of the truck. FIGS. 9 and 10 illustrate accent plate members having different colors.

Figure 1:
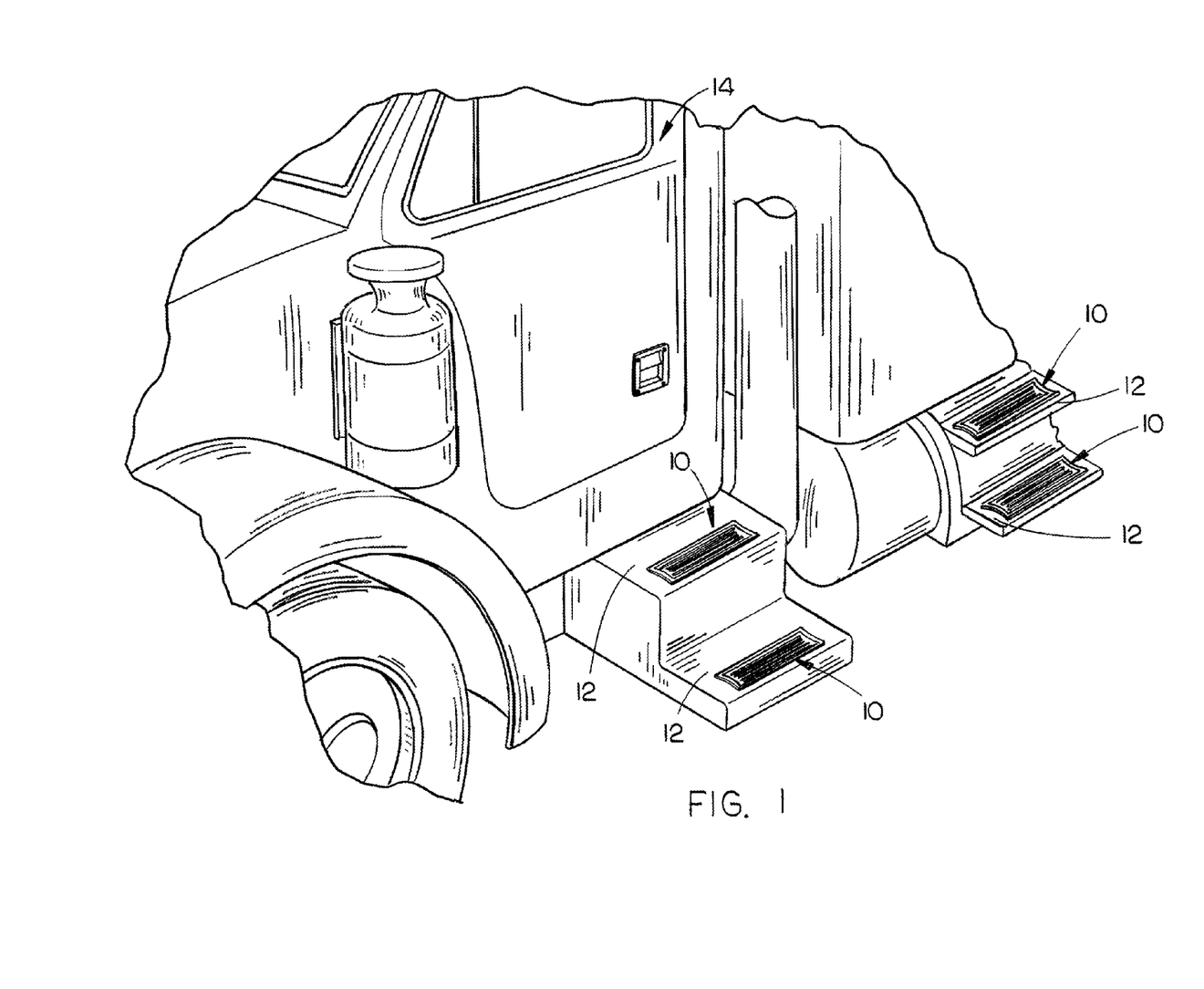
FIG. 1 is a partial perspective view which illustrates the anti-slip step plate of this invention being mounted on side steps of a truck adjacent the cab of the truck and also rearwardly thereof.
Figure 2:
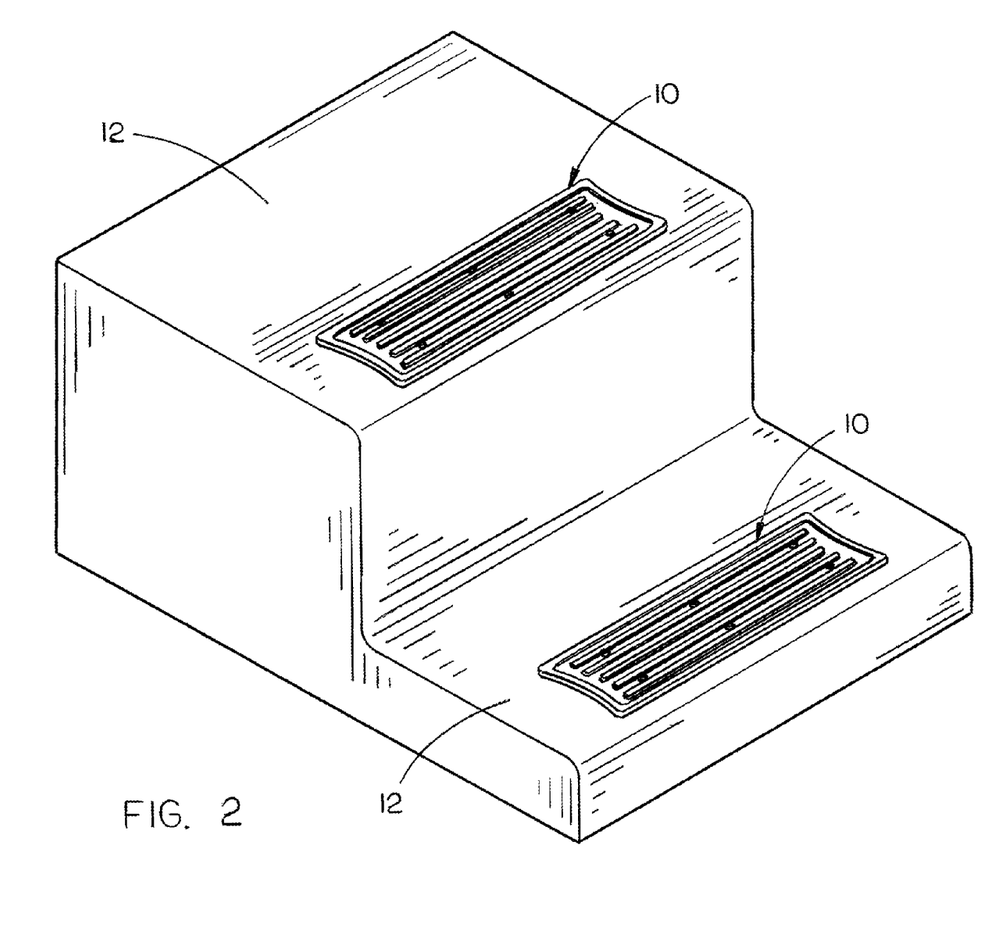
FIG. 2 is a perspective view of the anti-slip step plate of this invention being mounted on a pair of side steps.
Figure 3:
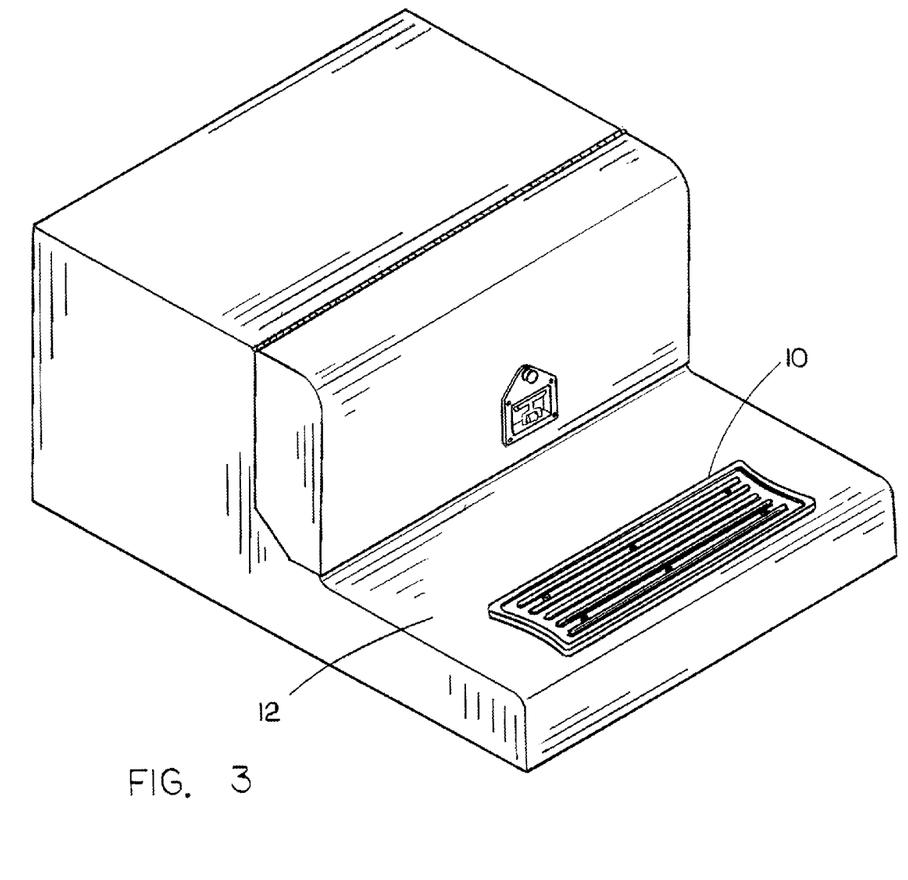
FIG. 3 is a perspective view of the anti-slip step plate of this invention being mounted on a different type of side step.
Figure 4:
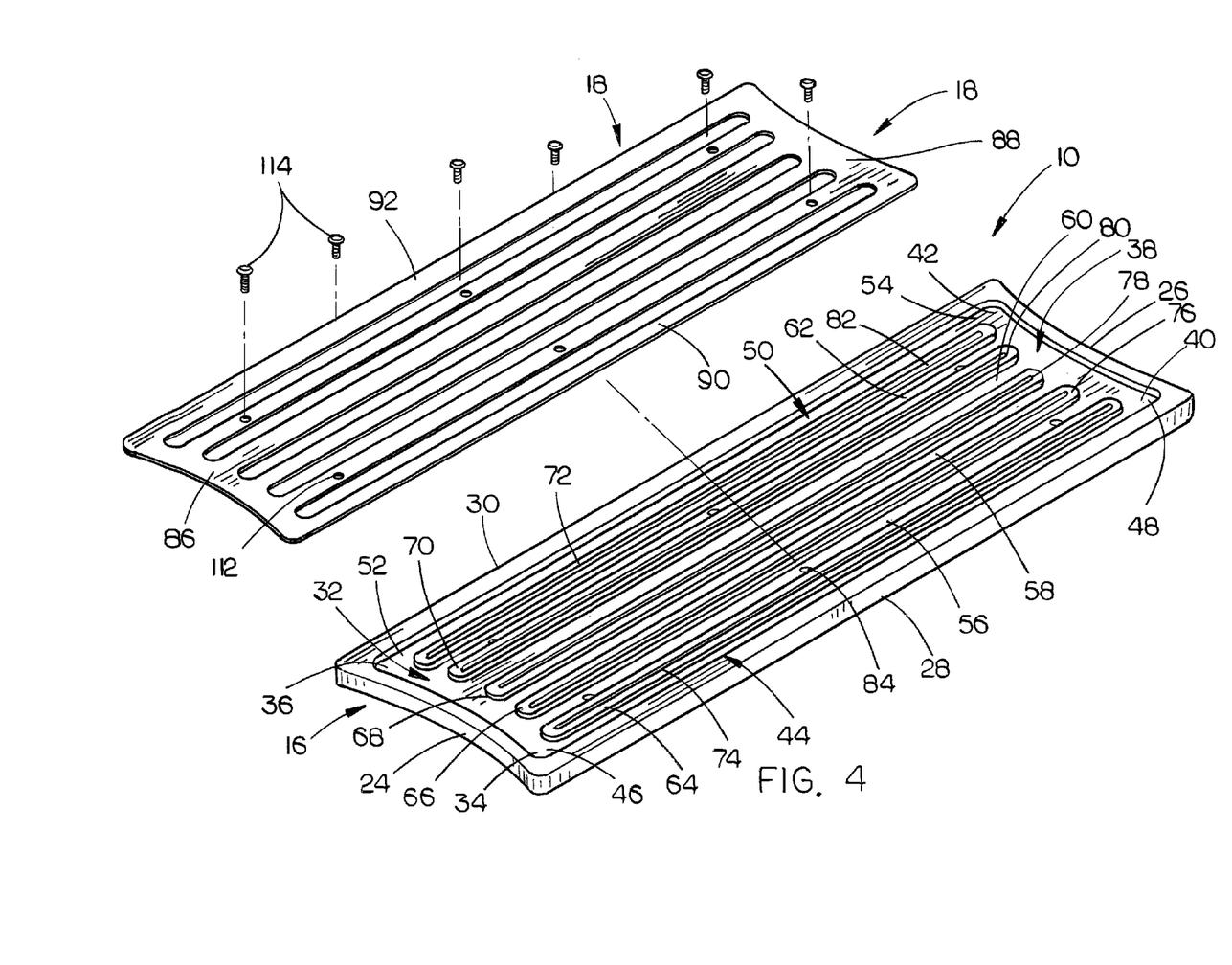
FIG. 4 is an exploded perspective view of the anti-slip step plate of this invention.
Figure 5:
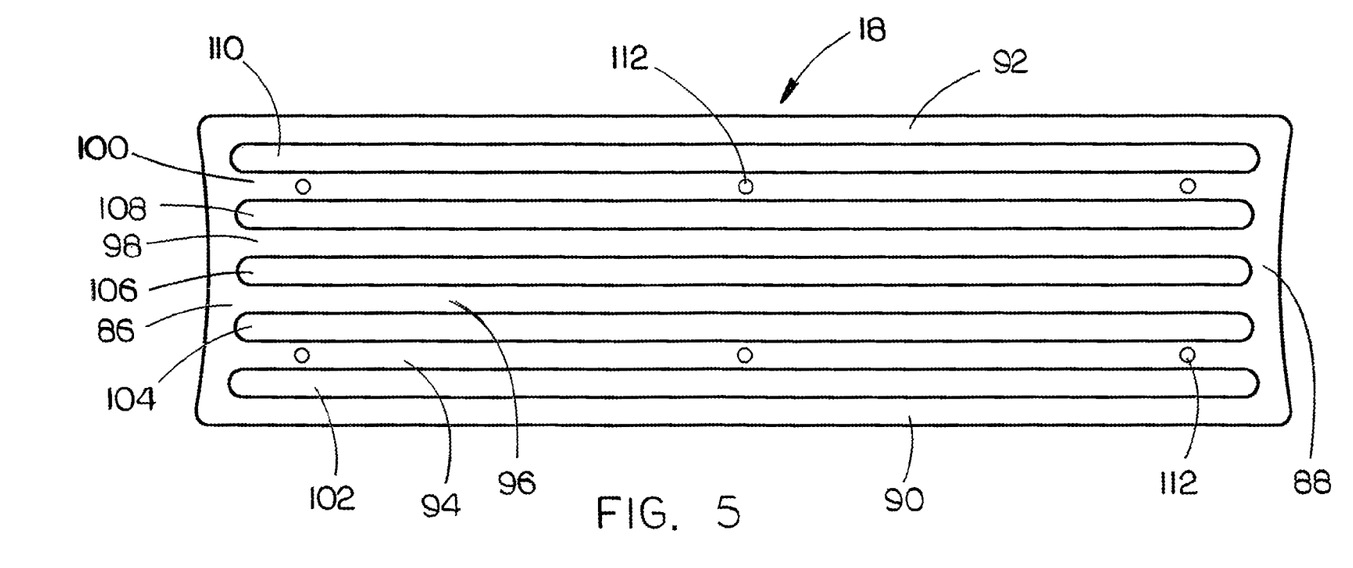
FIG. 5 is a top view of the accent plate member of the anti-slip step plate of this invention.
Figure 6:
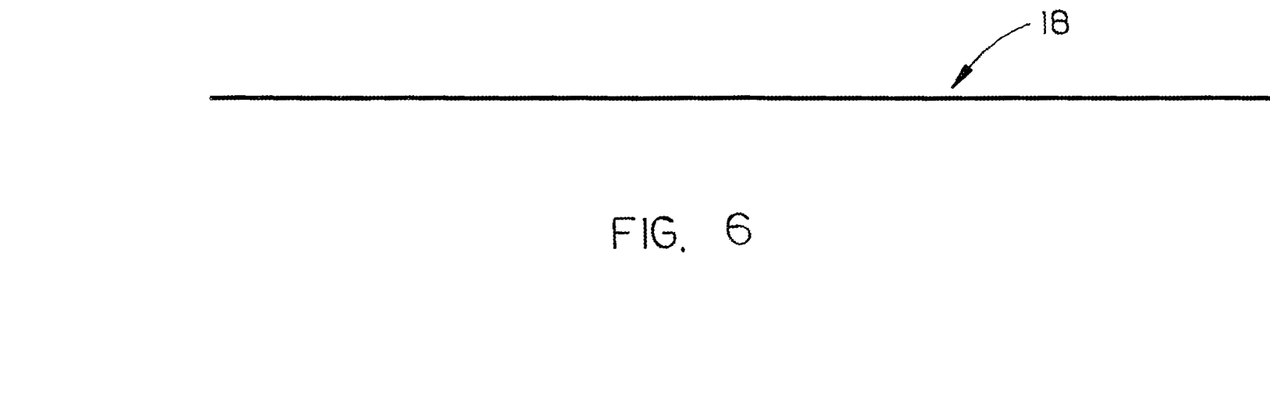
FIG. 6 is a side view of the accent plate member of FIG. 5.
Figure 7:
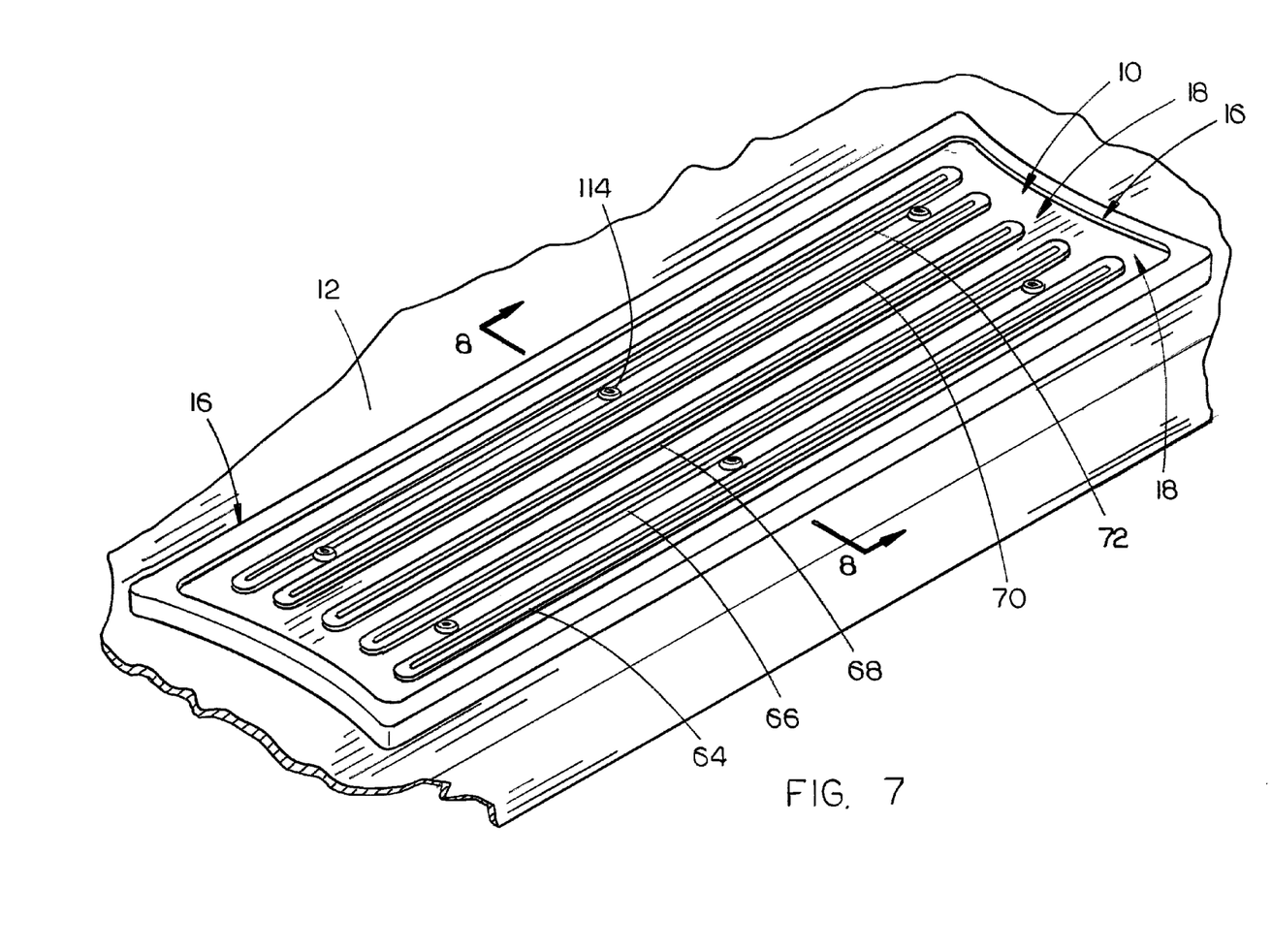
FIG. 7 is a partial perspective view of the anti-slip step plate of this invention mounted on a side step.

The anti-slip step plate 10 may also be positioned on steps 12 mounted rearwardly of the steps associated with the cab of the truck as seen in FIG. 1.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. An anti-slip step plate for placement on a horizontally disposed motor vehicle step, comprising:
    a horizontally disposed and generally rectangular-shaped base member having a first end, a second end, an outer end, an inner end, an upper surface and a flat lower surface;
    said base member being secured to said motor vehicle step;
    said upper surface of said base member having:
        (a) a generally transversely extending first end groove formed therein adjacent said first end of said base member and which has inner and outer ends;
        (b) a generally transversely extending second end groove formed therein adjacent said second end of said base member and which has inner and outer ends;

(c) a longitudinally extending outer end groove formed therein inwardly of said outer end of said base member and which has first and second ends;
(d) a longitudinally extending inner end groove formed therein outwardly of said inner end of said base member and which has first and second ends;
(e) said outer end of said first end groove communicating with said first end of said outer end groove and said inner end of said first end groove communicating with first end of said inner end groove;
(f) said outer end of said second end groove communicating with said second end of said outer end groove and said inner end of said second end groove communicating with said second end of said inner end groove;
(g) a plurality of spaced-apart and longitudinally extending intermediate grooves, having first and second ends, formed in said upper surface of said base member with said first ends of said intermediate grooves being in communication with said first end groove and with said second ends of said intermediate grooves being in communication with said second end groove;
said grooves defining an upstanding and elongated outer end bar, an upstanding and elongated inner end bar, and a plurality of upstanding and elongated intermediate bars positioned between said outer end and inner end bars;
each of said bars having upper ends;
said bars being spaced-apart;
each of said bars having an elongated groove formed therein which extends downwardly into said bar from said upper end thereof;
a generally rectangular accent plate member having a first end member, a second end member, an outer end member, an inner end member, an upper surface and a lower surface;
said accent plate member having a plurality of elongated and spaced-apart slots formed therein which are positioned between said outer end member and said inner end member;
said accent plate member being positioned on said base member so that:
(a) said first end member is received in said first end groove;
(b) said second end member is received in said second end groove;
(c) said outer end member is received in said outer end groove;
(d) said inner end member is received in said inner end groove;
(e) said slots receive said bars;
said accent plate member being secured to said base member.

2. The anti-slip plate of claim 1 wherein said base member and said accent plate member are comprised of a metal material.

3. The anti-slip plate of claim 1 wherein the color of said accent plate member is selected from the group of black, red, blue, yellow, green, and gray.

4. The anti-slip plate of claim 1 wherein said base member and said accent plate member are secured to the motor vehicle step by threaded connectors.

5. The anti-slip plate of claim 1 wherein said accent plate member is glued to said base member.

6. The anti-slip plate of claim 1 wherein said accent plate member is selectively removably secured to said plate member.

7. The anti-slip plate of claim 1 wherein the motor vehicle is a truck.

8. The anti-slip plate of claim 1 wherein said base member is secured to said step by double-faced adhesive tape.

9. The anti-slip plate of claim 1 wherein said accent plate member is secured to said base member by double-faced adhesive tape.

10. An anti-slip step plate for placement on a horizontally disposed motor vehicle step, comprising:
a horizontally disposed and generally rectangular-shaped base member having a first end, a second end, an outer end, an inner end, an upper surface and a flat lower surface;
said base member being secured to said motor vehicle step;
said upper surface of said base member having:
(a) a generally transversely extending first end groove formed therein adjacent said first end of said base member and which has inner and outer ends;
(b) a generally transversely extending second end groove formed therein adjacent said second end of said base member and which has inner and outer ends;
(c) a longitudinally extending outer end groove formed therein inwardly of said outer end of said base member and which has first and second ends;
(d) a longitudinally extending inner end groove formed therein outwardly of said inner end of said base member and which has first and second ends;
(e) said outer end of said first end groove communicating with said first end of said outer end groove and said inner end of said first end groove communicating with first end of said inner end groove;
(f) said outer end of said second end groove communicating with said second end of said outer end groove and said inner end of said second end groove communicating with said second end of said inner end groove;
(g) a plurality of spaced-apart and longitudinally extending intermediate grooves, having first and second ends, formed in said upper surface of said base member with said first ends of said intermediate grooves being in communication with said first end groove and with said second ends of said intermediate grooves being in communication with said second end groove;
said grooves defining an upstanding and elongated outer end bar, an upstanding and elongated inner end bar, and a plurality of upstanding and elongated intermediate bars positioned between said outer end and inner end bars;
each of said bars having upper ends;
said bars being spaced-apart;
a generally rectangular accent plate member having a first end member, a second end member, an outer end member, an inner end member, an upper surface and a lower surface;
said accent plate member having a plurality of elongated and spaced-apart slots formed therein which are positioned between said outer end member and said inner end member;
said accent plate member being positioned on said base member so that:
(a) said first end member is received in said first end groove;
(b) said second end member is received in said second end groove;
(c) said outer end member is received in said outer end groove;

(d) said inner end member is received in said inner end groove;

(e) said slots receive said bars;

said accent plate member being secured to said base member.

11. The anti-slip plate of claim 10 wherein said base member and said accent plate member are comprised of a metal material.

12. The anti-slip plate of claim 10 wherein the color of said accent plate member is selected from the group of black, red, blue, yellow, green, and gray.

13. The anti-slip plate of claim 10 wherein said base member and said accent plate member are secured to the motor vehicle step by threaded connectors.

14. The anti-slip plate of claim 10 wherein said accent plate member is glued to said base member.

15. The anti-slip plate of claim 10 wherein said accent plate member is selectively removably secured to said plate member.

16. The anti-slip plate of claim 10 wherein the motor vehicle is a truck.

17. The anti-slip plate of claim 10 wherein said base member is secured to said step by double-faced adhesive tape.

18. The anti-slip plate of claim 10 wherein said accent plate member is secured to said base member by double-faced adhesive tape.

19. An anti-slip step plate for placement on a horizontally disposed motor vehicle step, comprising:

a horizontally disposed and generally rectangular-shaped base member having a first end, a second end, an outer end, an inner end, an upper surface and a flat lower surface;

said base member being secured to said motor vehicle step;

said upper surface of said base member having:
  (a) a generally transversely extending first end groove formed therein adjacent said first end of said base member and which has inner and outer ends;
  (b) a generally transversely extending second end groove formed therein adjacent said second end of said base member and which has inner and outer ends;
  (c) a generally longitudinally extending outer end groove formed therein inwardly of said outer end of said base member and which has first and second ends;
  (d) a generally longitudinally extending inner end groove formed therein outwardly of said inner end of said base member and which has first and second ends;
  (e) said outer end of said first end groove communicating with said first end of said outer end groove and said inner end of said first end groove communicating with first end of said inner end groove;
  (f) said outer end of said second end groove communicating with said second end of said outer end groove and said inner end of said second end groove communicating with said second end of said inner end groove;
  (g) a plurality of spaced-apart and generally longitudinally extending intermediate grooves, having first and second ends, formed in said upper surface of said base member with said first ends of said intermediate grooves being in communication with said first end groove and with said second ends of said intermediate grooves being in communication with said second end groove;

said grooves defining an upstanding and elongated outer end bar, an upstanding and elongated inner end bar, and a plurality of upstanding and elongated intermediate bars positioned between said outer end and inner end bars;

each of said bars having upper ends;

said bars being spaced-apart;

each of said bars having an elongated groove formed therein which extends downwardly into said bar from said upper end thereof;

a generally rectangular accent plate member having a first end member, a second end member, an outer end member, an inner end member, an upper surface and a lower surface;

said accent plate member having a plurality of elongated and spaced-apart slots formed therein which are positioned between said outer end member and said inner end member;

said accent plate member being positioned on said base member so that:
  (a) said first end member is received in said first end groove;
  (b) said second end member is received in said second end groove;
  (c) said outer end member is received in said outer end groove;
  (d) said inner end member is received in said inner end groove;
  (e) said slots receive said bars;

said accent plate member being secured to said base member.

* * * * *